United States Patent [19]

Hoy et al.

[11] 3,784,108

[45] Jan. 8, 1974

[54] FLUIDIZED BED APPARATUS

[75] Inventors: Herbert Raymond Hoy, Surrey; Ronald Leslie Johnson, Bletchley; Whalley Vowe Battcock, Surrey, all of England

[73] Assignee: Coal Industry (Patents) Limited, London, England

[22] Filed: Dec. 7, 1971

[21] Appl. No.: 205,559

[30] Foreign Application Priority Data

Dec. 23, 1970 Great Britain................. 61,032/70

[52] U.S. Cl............ 239/264, 239/245, 239/DIG. 19
[51] Int. Cl............................................ B05b 3/02
[58] Field of Search.................. 239/226, 243–245, 239/248, 246, 264, 214.15, 214.17, 214.19, 214.25, 602, 132.3, DIG. 19

[56] References Cited
UNITED STATES PATENTS

| 1,582,943 | 5/1926 | Todd et al. ............... 239/244 X |
| 3,175,772 | 3/1965 | Marshall .................. 239/591 X |
| 3,412,986 | 11/1968 | Shepherd et al. .......... 239/132.3 X |
| 1,506,226 | 8/1924 | Dick .......................... 239/245 X |
| 1,613,660 | 1/1927 | Hoag.......................... 239/214.25 |
| 2,637,595 | 5/1953 | Fox et al..................... 239/244 |

FOREIGN PATENTS OR APPLICATIONS

| 260,478 | 11/1926 | Great Britain................ 239/245 |
| 467,506 | 10/1928 | Germany .................... 239/245 |

Primary Examiner—M. Henson Wood, Jr.
Assistant Examiner—John J. Love
Attorney—Stevens, Davis, Miller & Mosher

[57] ABSTRACT

Fluid material distributing apparatus for use in a fluidized bed consists of a rotatable shaft having a longitudinal passage therein communicating with nozzle members located adjacent an outlet of the shaft. The nozzle members are tubular arms affixed to a distribution head carried by the shaft. Fluid material is, in use, conveyed, e.g. pneumatically, through the passage and discharges through the arms by virtue of centrifugal force generated by the rotation of the shaft, the material thereby being distributed within the fluidized bed.

9 Claims, 3 Drawing Figures

FLUIDIZED BED APPARATUS

This invention relates to apparatus for distributing fluid materials in a fluidized bed.

The expression "fluid materials" as used herein includes gaseous or liquid materials and/or materials capable of flow in a manner similar to or the same as that of a gas or liquid, e.g. particulate or pulverulent materials.

In fluid bed processes it is essential that there should be uniform dispersal or distribution of material for maximum process efficiency. For example, in the field of fluidised bed combustion, it is necessary that fuel feed to the bed should be dispersed uniformly throughout the bed in a horizontal plane across the bed as low and as rapidly as possible because the air distribution cannot depart greatly from being uniform if satisfactory fluidization is to be maintained. It is desirable that the amount of fuel available to the air should be such that complete combustion is obtained with the minimum of excess air at all points on the surface of the bed.

An object of the invention is to provide apparatus for distributing fluid materials in a uniform pattern.

According to the invention apparatus for distributing fluid materials in a fluidized bed includes a rotatable shaft provided with an internal passage formed longitudinally thereof, an inlet and an outlet for fluid material in the shaft communicating with said passage, and a number of nozzle members associated with the shaft and located at or towards one end thereof in communication with said outlet.

Preferably the or each nozzle member is in the form of a tubular arm extending from the shaft and having one or more apertures formed therein for the discharge of fluid material. The or each arm may extend radially of the shaft perpendicularly to the axis thereof. Alternatively, the or each arm may radiate from the axis of the shaft at an angle thereto. The aperture may be located at the extremity of the arm remote from the shaft. Additional apertures may be located at points along the length of the arm. Alternatively the aperture may be a horizontal slot extending longitudinally of the arm.

Conveniently the or each arm is attached to the shaft through the agency of a distribution head secured to the end of the shaft. A further relatively upper distribution head may be arranged superjacent the aforementioned head, the further head having attached radially thereto nozzle members of the form hereinbefore described. The further head may be attached to the first mentioned head and in this case a relatively inner conduit is provided which extends co-axially within the rotatable shaft to define an annular space therebetween. The inner conduit is tubular and has an inlet and an outlet for fluid material, the outlet communicating with said further head. Alternatively, the further head may be separate from the first mentioned head and the inner conduit may be independently rotatable within the rotatable shaft.

The tubular arms attached to the relatively upper head may conveniently be of shorter length than the tubular arms of the first mentioned head. Where the apparatus is to be utilised in high temperature conditions the arm may be provided with heat insulative material to minimize heat transfer through the arm to fluid material which in use flows therethrough. The heat insulative material may be situated between the arm and an outer casing therefor, the casing being made from a material selected for its resistance to abrasion and corrosion at temperatures approaching that of the fluidised bed. The casing may be cylindrical or may be suitably profiled to minimize resistance to movement through the fluidized material, to effect movement of the fluidized material and/or to minimize abrasion of the casing. For example, the profile may be of aerofoil section or elliptical or substantially elliptical. Alternatively, each arm may be provided with a casing defining a cooling space between it and the arm; in use a fluid cooling medium e.g. water or gas is passed through the space to cool the arm and thus reduce the rate at which heat is transferred to the material flowing through the arm. The cooling medium may be conveyed to the arm through a gland and a suitable duct in the rotatable shaft and returned in a similar manner or, where the process allows, may be discharged into the fluidized bed. Again, the casing may be profiled in a similar manner as aforesaid. In the absence of a casing the arm itself may be similarly profiled.

Conveniently drive means are provided for rotating the rotatable shaft and further independent drive means are provided for the inner conduit when this is to be rotated independently. A cooling medium may be passed through suitable ducts to cool the rotatable shaft and the medium may be supplied to annular spaces round the shaft to prevent granular material getting into seals or bearings. The drive means may be of any conventional form but may be provided with torque limiting features.

By way of example only, apparatus for distributing fluid materials in a fluidized bed according to the invention is described below with reference to the accompanying drawings in which.

Figure 1:
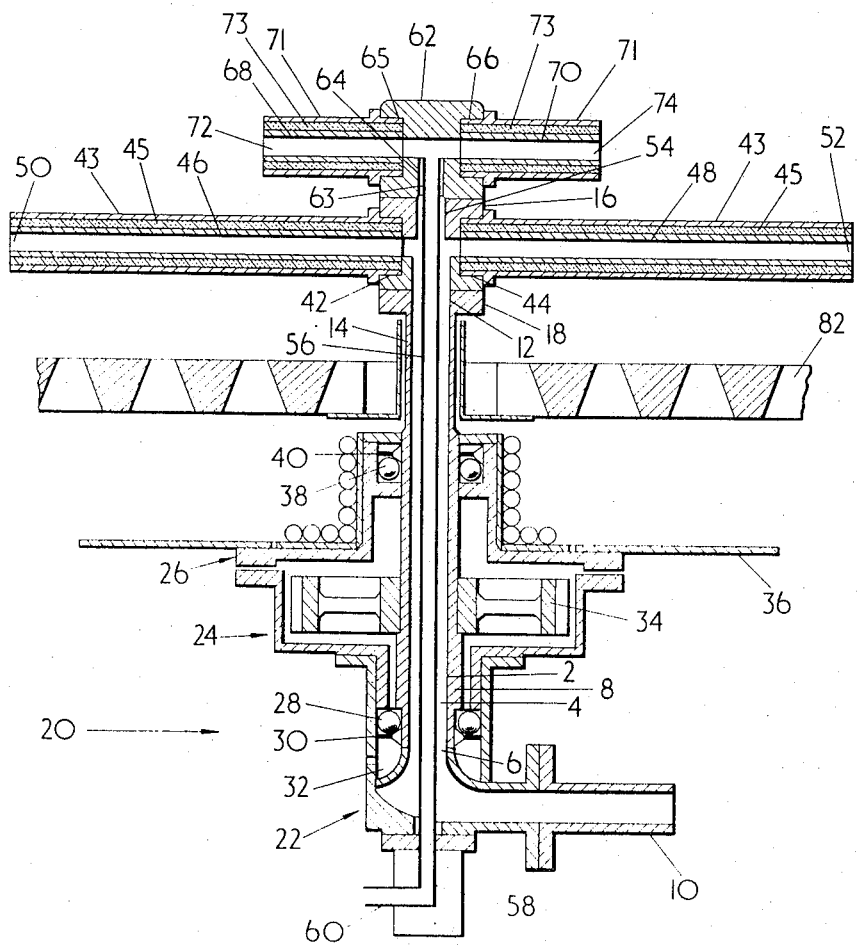
FIG. 1 is a cross-sectional view.

Referring to FIG. 1, apparatus for distributing fluid materials includes a rotatable shaft 2 having a longitudinal passage 4 formed therein. The shaft 2 has an inlet 6 at its lower end 8 communicating with a fixed inlet conduit 10, and an outlet 12 at its upper end 14, which communicates with a distribution head 16, the head 16 being detachably secured to a flange 18 formed on the upper end 14 of the shaft.

The shaft 2 is mounted for rotation in a casing assembly indicated generally by the reference numeral 20. The assembly 20 includes three parts, a lower part 22, an intermediate part 24 and an upper part 26. The shaft 2 is supported at its lower end in lower part 22 by a bearing 28, subjacent to which is a seal 30. The inlet conduit 10 extends into the part 22 and communicates directly with the inlet 6 of the shaft 2 to define an annular space 32 below the seal 30. The space 32 is provided for the ingress of a high pressure gas medium at such pressure as to assist in preventing extraneous matter from entering the space from duct 10. The intermediate part 24 is secured to the lower part 22 and constitutes a gear box containing a gear train including a driven pinion 34 keyed to the shaft 2. The seal 30 prevents contamination of the gear train and the bearing 28 by extraneous matter, for example, fluid material flowing through the shaft 2. The upper part 26 is fixed to the intermediate part 24 and is adapted for securement to a base support 36 of, for example, a fluidized combustor (not shown). The part 26 houses an upper bearing 38 for supporting the shaft 2 and an upper seal 40 superjacent the bearing 38. The seal 40 prevents contamination of the gearbox and bearing 38 by extraneous matter, e.g. material which may escape from the combustor located thereabove. The shaft 2 extends beyond the part 26 terminating at its upper end 14 in flange 18 which carries the distribution head 16.

The head 16 is substantially cylindrical and has two radial ports 42, 44 each having an arm 46, 48 respectively. The arms 46, 48 extend radially of the head 16 and are secured in the ports 42, 44, the arms being tubular and having an outer casing 43 of wear resistant material and an intermediate layer 45 of heat insulative material extending over substantially the whole surface of the arms 46, 48. The arms 46, 48 have discharge apertures 50, 52 at their free ends remote from the head 16.

The head 16 has a central bore 54 through which extends a fixed inner tubular conduit 56, the conduit 56 extending downwardly through the rotatable shaft 2 and communicating at its lower end 58 with an input duct 60. The inner conduit 56 further extends upwardly to communicate with an upper head 62 through a bore 64 formed therein; a seal 63 is arranged outside the conduit 56 within the bore 64 of the upper head 62.

The upper head 62 has two radial outlets 65, 66 having arms 68, 70 respectively, and is secured to the head 16 for rotation therewith. Each arm 68, 70 is tubular and has an outer casing 71 of wear resistant material and an intermediate layer of heat insulative material 73 extending over substantially the whole outer surface of the arms 68, 70, which are provided with discharge apertures 72, 74 respectively, at their free ends remote from the head 62. In this particular embodiment, the arms 68, 70 are shorter than the arms 46, 48.

Figure 2:
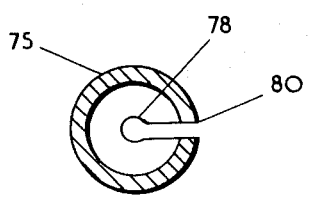
FIG. 2 is a cross-sectional view of an alternative embodiment of a detail shown in FIG. 1.
Figure 3:
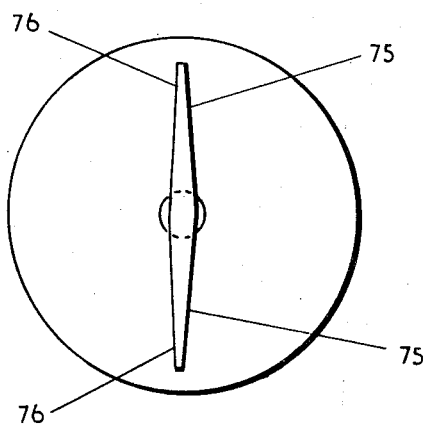
FIG. 3 is a plan view of the detail shown in FIG. 2.

FIGS. 2 and 3 show an alternative form of arm to that shown in FIG. 1. Each arm 75 is tapered and has at its smallest end 76 an aperture 78. Additionally the arm is provided with an elongate slot 80 extending longitudinally thereof; in use the slot 80 would be on the trailing side of the arm 75, such that material issuing through the slot 80 is distributed in the wake of the arm. Although in this embodiment the slot 80 is continuous along the length of each arm 75, it is envisaged that a series of slots 80 of shorter length could be provided.

If, for example, the apparatus of the invention is utilized in a fluidized combustor (not shown) for the distribution of fuel therein the apparatus is affixed to the body 36 of the combustor as shown such that the heads 16 and 62 are located above a gas-permeable support grid 82 as shown in FIG. 1. The apparatus operates as follows:

The shaft 2 is rotated through the gear train in part 24 by drive means (not shown) and fuel, for example coal in particulate or pulverulent form, is pneumatically conveyed through the inlet conduit 10 to the inlet 6 of the rotatable shaft 2. The coal passes through the passage 4 until it reaches the head 16 whence the coal is transported through the arms 46, 48 to be discharged therefrom through the discharge apertures 50, 52. Simultaneously, coal feed is introduced to the distributor conduit 56 via the input duct 60 and the lower end 58 of the shaft. The coal feed is pneumatically transported up through the conduit 56 until it enters the head 62 from which it is discharged into the fluid bed through discharges apertures 72, 74 of arms 68, 70. The angular velocity of the arms is preferably such that the time for one revolution would be less than the height of the fluidized bed divided by the fluidizing velocity of the fluidizing medium employed to fluidize the bed.

It is to be understood that the invention is not limited to the specific embodiments and that variations of the apparatus shown lie within the scope of the invention. For example, such variations include the exclusion of the inner conduit 56 such that the material feed is common to all the arms, 46, 48, 68 and 70. Alternatively each arm may be in communication with a separate duct within the shaft 2, each duct being fed separately so that the rate of material feed to each arm may be controlled separately. Additionally it is envisaged that the inner conduit 56 may be rotatable separately from the shaft 2, the head 62 being secured to shaft 56 and separate from the head 16. The distribution of material could then be effected by the upper head 62 and tubes 68, 70, independently of the shaft 2; similarly the shaft 2 and hence the head 16 could be rotated independently of the conduit 56. Suitable bearings, seals, blands and a driving mechanism would be provided for the inner conduit 56 for independently rotating the head 62.

As a further alternative the conduit 56, in this specific embodiment described above with reference to the drawings, may be secured to the head 62 so as to be rotatable therewith and with the head 16, in which case the input duct 60 would be fixed and a sealing arrangement similar to that for shaft 2 would be employed.

Examples of fluid materials which may be distributed by the apparatus of the invention are particulate solid fuel, liquid fuel, gaseous fuel, mixtures of fuel and oxygen-containing gas or reactants such as particulate limestone, or inert particulate material.

It is to be understood that fluid materials to be distributed by the apparatus may be conveyed therethrough by any suitable fluid transport medium e.g. air, water, oil or gas.

We claim:

1. In a fluidized bed combuster comprising a body and a fluid material distributing apparatus, the improvement which comprises employing a fluid material distributing apparatus comprising a rotatable shaft, a passage formed longitudinally within the shaft, fluid material inlet means and fluid material outlet means in the shaft, said inlet and outlet means communicating with the passage, and a number of tubular nozzle members each in communication with the outlet means having an abrasion and corrosion resistant casing located about each tubular nozzle member and a thermal insulative medium situated interjacent each tubular nozzle member and its associated casing.

2. The fluidized bed combuster according to claim 1 including a first distribution head attached to the shaft, the head being located adjacent and in communication with said outlet means, at least one of said tubular nozzle members being attached to said head.

3. The fluidized bed combuster according to claim 2 including a second distribution head located superjacent the first distribution head, at least one of said tubular nozzle members being attached to the second head.

4. The fluidized bed combustor according to claim 3 wherein the second distribution head is attached to the first distribution head.

5. The fluidized bed combuster according to claim 4 including a fixed feed conduit extending coxially within the passage of the shaft, a fluid material inlet means and outlet means in the conduit, the outlet means communicating with the second distribution head.

6. The fluidized bed combuster according to claim 2 wherein the second distribution head is attached to and communicates with the first distribution head.

7. The fluidized bed combuster according to claim 1 wherein each tubular nozzle member is provided with discharge means.

8. The fluidized bed combuster according to claim 6 wherein the discharge means is an aperture in the nozzle member located at the face end thereof.

9. The fluidized bed combuster according to claim 6 wherein the discharge means is elongate and extends longitudinally of the tubular nozzle member.

* * * * *